United States Patent
Rawlings et al.

(10) Patent No.: US 8,678,316 B2
(45) Date of Patent: Mar. 25, 2014

(54) AMORPHOUS METAL RIBLETS

(75) Inventors: Diane C. Rawlings, Bellevue, WA (US); Stephen Christensen, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 1455 days.

(21) Appl. No.: 12/361,918

(22) Filed: Jan. 29, 2009

(65) Prior Publication Data

US 2010/0187361 A1  Jul. 29, 2010

(51) Int. Cl.
*B64C 1/38* (2006.01)
*B64C 21/10* (2006.01)

(52) U.S. Cl.
USPC ................ 244/130; 244/198; 244/200

(58) Field of Classification Search
USPC ........... 244/130, 198, 199.1, 200, 200.1, 201, 244/203, 204, 204.1, 205, 206
See application file for complete search history.

(56) References Cited

U.S. PATENT DOCUMENTS

| | | | |
|---|---|---|---|
| 4,706,910 A | 11/1987 | Walsh et al. | |
| 4,736,912 A | 4/1988 | Loebert | |
| 4,865,271 A | 9/1989 | Savill | |
| 4,930,729 A | 6/1990 | Savill | |
| 4,932,612 A | 6/1990 | Blackwelder et al. | |
| 5,054,412 A | 10/1991 | Reed et al. | |
| 5,069,403 A * | 12/1991 | Marentic et al. | 244/130 |
| 5,133,516 A * | 7/1992 | Marentic et al. | 244/130 |
| 5,133,519 A | 7/1992 | Falco | |
| 5,386,955 A * | 2/1995 | Savill | 244/200 |
| 5,445,095 A * | 8/1995 | Reed et al. | 244/130 |
| 5,686,003 A * | 11/1997 | Ingram et al. | 244/134 D |
| 5,848,769 A * | 12/1998 | Fronek et al. | 244/200 |
| 5,860,626 A | 1/1999 | Moser | |
| 5,971,326 A | 10/1999 | Bechert | |
| 5,988,568 A * | 11/1999 | Drews | 244/200 |
| 6,177,189 B1 * | 1/2001 | Rawlings et al. | 428/343 |
| 6,345,791 B1 * | 2/2002 | McClure | 244/200 |
| 6,994,045 B2 | 2/2006 | Paszkowski | |
| 7,041,363 B2 * | 5/2006 | Krohmer et al. | 244/200 |
| 7,044,073 B2 | 5/2006 | Goldstein | |
| 7,066,551 B2 * | 6/2006 | Johnson | 244/122 R |
| 7,070,850 B2 * | 7/2006 | Dietz et al. | 244/200 |
| 7,101,448 B2 * | 9/2006 | Wydra | 148/527 |
| 7,300,112 B2 * | 11/2007 | Johnson | 244/122 R |
| 7,861,969 B2 * | 1/2011 | Guzman et al. | 244/120 |

(Continued)

FOREIGN PATENT DOCUMENTS

EP  0 284 187 A1  9/1988
WO  03/087604 A1  10/2003

OTHER PUBLICATIONS

Sinha, Sumon K., Revolutionary Aerodynamics, presentation downloaded from www.sinhatech.com, Feb. 3, 2008.
Walsh, M. J. and Weinstein, L M., Drag and Heat Transfer on Surfaces with Small Longitudinal Fins, AIAA 11th Fluid and Plasma Dynamics Conference, Jul. 10-12, 1978.

(Continued)

*Primary Examiner* — Tien Dinh
*Assistant Examiner* — Steven Hawk
(74) *Attorney, Agent, or Firm* — Felix L. Fischer

(57) ABSTRACT

An array of aerodynamic riblets is created by a plurality of high stiffness tips with a layer supporting the tips in predetermined spaced relation and adhering the tips to a vehicle surface.

4 Claims, 10 Drawing Sheets

(56) References Cited

U.S. PATENT DOCUMENTS

| | | | |
|---|---|---|---|
| 8,413,928 B2 * | 4/2013 | Rawlings et al. | 244/130 |
| 2004/0126541 A1 | 7/2004 | Dietz | |
| 2004/0200932 A1 | 10/2004 | Scott et al. | |
| 2006/0060722 A1 | 3/2006 | Choi et al. | |
| 2007/0194178 A1 * | 8/2007 | Lang | 244/130 |
| 2007/0257400 A1 | 11/2007 | Stenzel et al. | |
| 2008/0061192 A1 * | 3/2008 | Sullivan | 244/200 |
| 2008/0226843 A1 * | 9/2008 | Fukubayashi et al. | 427/597 |
| 2008/0233356 A1 | 9/2008 | Loher et al. | |
| 2008/0290214 A1 * | 11/2008 | Guzman et al. | 244/119 |
| 2010/0108813 A1 * | 5/2010 | Lang | 244/130 |
| 2010/0127125 A1 * | 5/2010 | Li et al. | 244/119 |
| 2011/0186685 A1 * | 8/2011 | Tsotsis et al. | 244/130 |

OTHER PUBLICATIONS

Mani, Raghavendran; Lagoudas, Dimitris C. and Rediniotis, Othon K, Active skin for turbulent drag reduction, Smart Mater. Struct. 17 (2008) 035004 (18pp), IOP Publishing.

V. Giurgiutiu, K. Reifsnider, C. Rogers, Rate-Independent Energy Dissipation Mechanisms in Fiber-Matrix Material Systems, AAIA-96-1420-CP, 1996, pp. 897-907.

W. Ni, Y. Cheng, M. Lukitsch, A. Weiner, L. Lev, D. Grummon, Novel Layered Tribological Coatings using a Superelastic NiTi Interlayer, Wear 259 (2005) pp. 842-848.

A. Leyland, A. Matthews, On the Significance of the H/E Ratio in Wear Control: A Nanocomposite Coating Approach to Optimized Tribological Behavior, Wear 246 (2000) pp. 1-11.

* cited by examiner

AMORPHOUS METAL RIBLETS

REFERENCE TO RELATED APPLICATIONS

This application is copending with U.S. patent application Ser. No. 12/361,840 filed substantially concurrently herewith entitled Rigid Tipped Riblets and U.S. patent application Ser. No. 12/361,882 filed substantially concurrently herewith entitled Shape Memory Riblets the disclosures of which are incorporated herein by reference.

BACKGROUND INFORMATION

1. Field

Embodiments of the disclosure relate generally to the field of surface geometries for aerodynamic improvements to aircraft or surfaces having a flow interface and more particularly to embodiments and fabrication methods for use of amorphous metal alloys to form aerodynamic riblets or other high-aspect-ratio surface microstructures requiring high durability.

2. Background

Increasing fuel efficiency in modern aircraft is being accomplished through improvement in aerodynamic performance and reduction of structural weight. Recent advances in the use of microstructures such as riblets on aerodynamic surfaces have shown significant promise in reducing drag to assist in reducing fuel usage. Riblets have various forms but advantageous embodiments may be ridge-like structures that minimize drag on the surface of an aircraft. Riblets may be used in areas of a surface of an aircraft where turbulent regions may be present. Riblets may limit circulation causing a breakup of large scale vortices in these turbulent regions near the surface in the boundary layer to reduce drag.

In certain tested applications riblets have been pyramidal or inverted V shaped ridges spaced on the aerodynamic surface to extend along the surface in the direction of fluid flow. Riblet structures have typically employed polymeric materials, typically thermoplastics. However in service use such as on an aircraft aerodynamic surface, polymers are relatively soft thus reducing the durability of the surface. Existing solutions with polymeric tips may readily deform hundreds of percent with fingernail pressure and may be unrecoverable. Such structures may be undesirable in normal service use on an aircraft or other vehicle. Additionally aircraft surfaces are typically required to withstand interactions with various chemicals including Skydrol®, a hydraulic fluid produced by Solutia, Inc. In certain applications elastomers that resist or recover from severe deformation created at the tip may be employed to form the riblets. However, many elastomers and other polymers are not compatible with Skydrol® or other aircraft fluids or solvents.

The practicality of riblets for commercial aircraft use would therefore be significantly enhanced with a riblet structure providing increased durability and aircraft fluids compatibility.

SUMMARY

Exemplary embodiments provide a multilayer construction having a first layer composed of a material with riblets, the first layer material exhibiting a first characteristic of having high stiffness and a second layer composed of a second material exhibiting a second characteristic with capability for adherence to a surface. The multilayer construction is employed in exemplary embodiments wherein the riblets are implemented on a vehicle, the riblets having long-term durability due to the properties of the first layer.

In various embodiments, an array of aerodynamic riblets is created by a plurality of high stiffness tips with a layer supporting the tips in predetermined spaced relation and adhering the tips to a vehicle surface. In exemplary embodiments, the high stiffness tips are formed from material selected from the set of nickel, chromium, metal alloy, glass, ceramic, silicon carbide and silicon nitride. Additionally, the supporting layer may be continuously cast with the tips as a surface layer. Alternatively, a polymer support layer is deposited on the surface layer opposite the tips. An adhesive layer deposited on the polymer support layer forms a multilayer appliqué, and provides the capability for adhering the appliqué to the vehicle surface.

In another exemplary embodiment, the supporting layer is an elastomeric layer engaging the tips and a metal foil and a polymer layer are provided intermediate the elastomeric layer and the adhesive layer. The metal foil, polymer layer and adhesive layer may be provided as a preformed appliqué. For exemplary embodiments using the elastomeric layer, the tips each incorporate a base and each base may be embedded in the elastomeric layer.

For greater flexibility in certain applications, each tip is segmented in the flow direction.

An embodiment for an aircraft structure employs an array of aerodynamic riblets having a plurality of amorphous metal tips formed from material selected from the set of Vitreloey 105 (Zr: 52.5 Ti: 5 Cu: 17.9 Ni: 14.6 Al: 10) or Vitreloy 106a (Zr: 58.5 Cu: 15.6 Ni: 12.8 Al: 10.3 Nb: 2.8). The amorphous metal tips are highly reflective for a decorative feature. Each tip includes a base and each tip is segmented in the flow direction. An elastomeric layer supports said amorphous metal tips in predetermined spaced relation with the base of each tip embedded in the elastomeric layer. A preformed appliqué which incorporates a metallic layer, a polymer support layer and an adhesive layer is deposited on the elastomeric layer opposite the tips to form a multilayer appliqué. The adhesive layer adheres the multilayer appliqué to a surface of the aircraft.

The embodiments disclosed are fabricated in an exemplary method by forming a master tool having protuberances corresponding to a desired riblet array and forming a complementary tool from the master tool. A plurality of high stiffness tips is then cast in the master tool using electroforming or other desirable deposition technique. The cast tips are then removed from the complementary tool and adhered to an aerodynamic surface.

In exemplary aspects of the method, resist is applied to the complementary tool for a segregating the high stiffness tips and removed subsequent to casting the high stiffness tips. An elastomeric layer is the cast engaging the high stiffness tips and a multilayer appliqué is applied to the elastomeric layer to form a riblet array appliqué.

In exemplary embodiments of the method, the multilayer appliqué comprises a metal foil, a polymer support layer and an adhesive layer. An adhesive liner and masking may be employed for handling. The riblet array may then be adhered to the aerodynamic service by removing the adhesive liner and applying the riblet array appliqué to the aerodynamic surface and removing the masking.

In an alternative method, casting the plurality of high stiffness tips includes melt casting of the plurality of tips and an intermediate surface layer as a cladding. An elastomeric layer is then cast to the cladding.

In yet another alternative method, fabricating an array of aerodynamic riblets is accomplished by forming a master tool having protuberances corresponding to a desired riblet array and then forming a complementary tool from the master tool. An amorphous metal cladding is then cast in the complimentary tool and a polymer layer of tip cores and support layer is cast into the cladding forming a multi layer array of high stiffness riblets. The multilayer array of high stiffness riblet array to an aerodynamic surface and the complimentary tool is then removed from the riblet array.

In one aspect of the method embodiment, the complimentary tool is formed from silicon and removing the complimentary tool is accomplished by stripping the silicon tool from the riblet array.

In another aspect of the method embodiment, the complimentary tool is formed from a soluble polymer and removing the complimentary tool is accomplished by dissolving the polymer tool from the riblet array.

A method for fabricating an array of aerodynamic riblets for an aircraft surface is accomplished by forming a master tool having protuberances corresponding to a desired riblet array and forming a complementary tool from the master tool. A core layer having plurality of tip cores and a support layer is then cast in the complimentary tool. The core layer is selected from the set of a polymer, selected from the subset of thermoplastic polyurethanes, PEEK, PEKK or polyamide, an elastomeric, selected from the subset of polyurethane elastomers, polysulfide elastomers, epoxy-based elastomers, silicones, fluoroelastomers, fluorosilicone elastomers, Ethylene-Propylene-Diene Monomer (EPDM) elastomers, and polyhedral oligosilsesquioxane (POSS)-modified polyurethane, or a shape memory alloy (SMA), selected from the subset of copper-zinc-aluminum-nickel, copper-aluminum-nickel, nickel-titanium (NiTi) and pseudo-elastic beta titanium alloys. The cast core layer is removed from the complementary tool. An amorphous metal cladding is deposited over the cast core layer forming an array of high stiffness riblets. An adhesive layer is then deposited on the core layer opposite the tips to form a multilayer appliqué. The multilayer appliqué is then adhered to an aerodynamic surface of an aircraft using the adhesive layer.

BRIEF DESCRIPTION OF THE DRAWINGS

The features and advantages of embodiments disclosed herein will be better understood by reference to the following detailed description when considered in connection with the accompanying drawings wherein.

DETAILED DESCRIPTION

Figure 1:
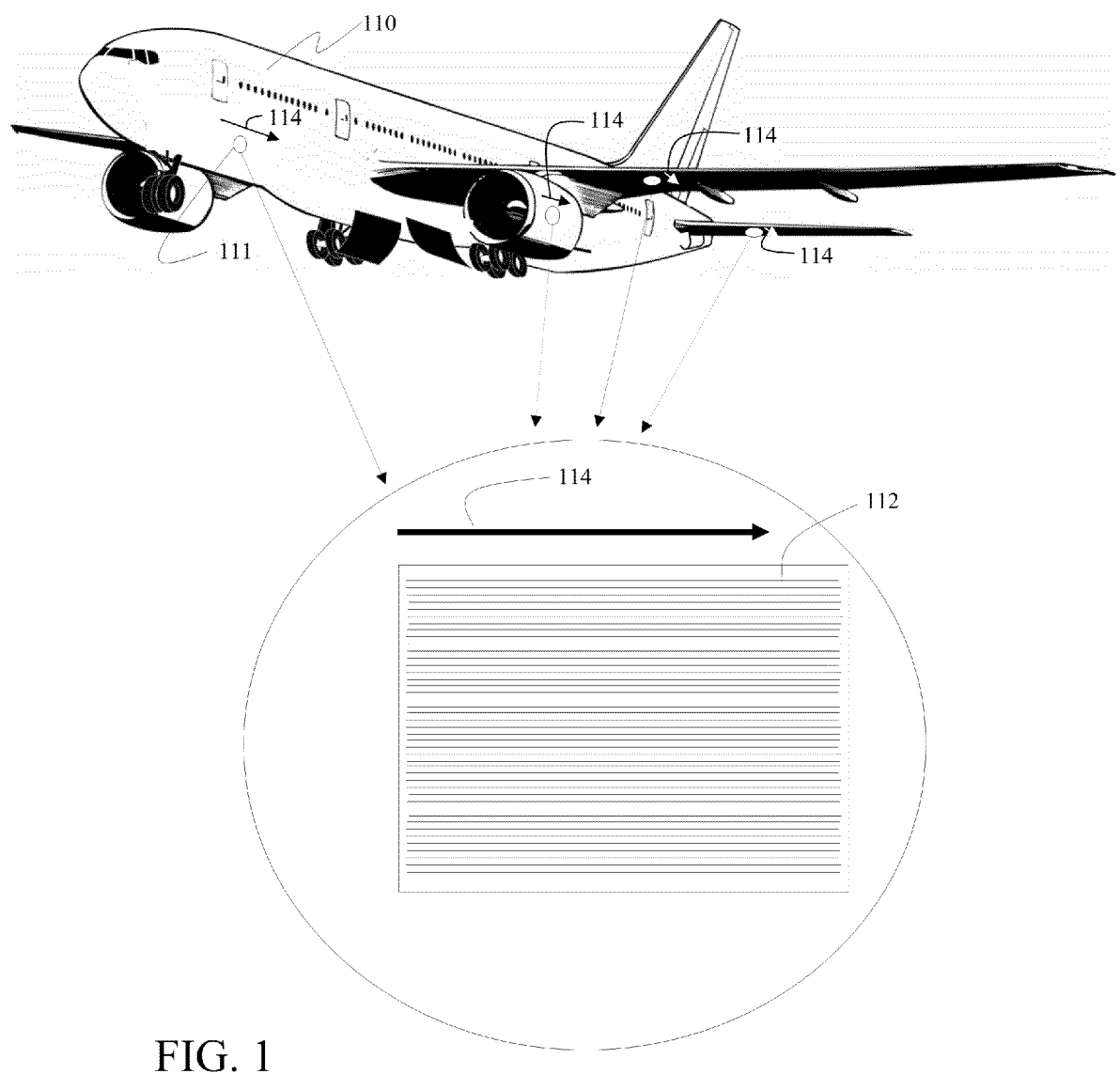
FIG. 1 is an isometric view of a portion of an aerodynamic surface such as a wing or fuselage skin showing exemplary riblets extending in the flow direction.

The embodiments disclosed herein provide riblets constructed with high stiffness materials that may be impacted by ground support equipment or environmental hazards such as hail without permanent deformation/damage. As used herein, high stiffness refers to materials having moduli of elasticity in a range of about $10\text{-}30 \times 10^6$ lb/in$^2$ and preferably in the range of about $10\text{-}20 \times 10^6$ lb/in$^2$ with typical examples being the first transition metals of the first row in the periodic table and alloys thereof. Deformation response of these stiff materials may be somewhat ductile having a non-linear response in the elastic region. These embodiments also allow a design change in riblets providing the capability for them to be thinner and more aerodynamically efficient. Amorphous metals may also be highly reflective in the visible spectrum (a characteristic of amorphous metals) enhancing the color/decorative features of the riblet surface with a highly shiny appearance. Further, environmental enhancements such as corrosion resistance and ice formation prevention or reduction may be provided by an amorphous metal cladding.

An exemplary embodiment of amorphous metal riblets, having a structure as will be described in greater detail subsequently, is shown as a portion of an aerodynamic surface for an aircraft in FIG. 1. The aircraft 110 employs a structure with a surface 111, shown enlarged, having multiple substantially parallel riblets 112 arranged parallel to the flow direction as represented by arrows 114. For the exemplary embodiment shown, the dimension 116 perpendicular to the surface 111 is approximately 0.002 inch while the spacing 118 between the riblets is approximately 0.003 inch as shown for example in FIGS. 2A and 2B. Spacing may vary depending on the fluid dynamic properties of the air, water or other fluid for which the application of riblets is employed. The aerodynamic surface is typically, without limitation, curved and may be a portion of a wing, an engine nacelle, a control surface, a fuselage or other suitable surface. Therefore flexibility and conformability of the riblets and any structure supporting and affixing the riblets to the surface may be required. While described herein with respect to an aircraft aerodynamic surface the embodiments disclosed herein are equally applicable for drag reduction on surfaces of other aerospace vehicles such as, without limitation, missiles or rockets and other vehicles such as cars, trucks, buses and trains moving in a gaseous fluid, commonly air, or on boats, submarines, hydrofoils, fluid flow conduits or other surfaces exposed to liquid fluid flow.

The embodiments disclosed herein recognize and provide the capability for riblets that may resist various impacts and/or other forces that may reduce riblet durability. Further, certain of the different advantageous embodiments provide a multi-layer structure that may have a support layer and a plurality of riblet tips located on or extending from the support layer. The tips which form the riblets may be fabricated, for example without limitation, by casting amorphous metal alloys such as Vitreloey 105 (Zr: 52.5 Ti: 5 Cu: 17.9 Ni: 14.6 Al: 10) or Vitreloy 106a (Zr: 58.5 Cu: 15.6 Ni: 12.8 Al: 10.3 Nb: 2.8), which are well known for their moldability, stiffness, inertness, and shiny surface. The cast surfaces could be highly reflective in the visible spectrum (due to this characteristic of amorphous metals) providing or enhancing a color/decorative feature for a vehicle by addition of the riblet surface. The materials of the multilayer structure are flexible and may be formed as an appliqué separately or in combination with the riblet tips for fastening to a surface to improve aerodynamics of a vehicle such as an aircraft.

Figure 2A:
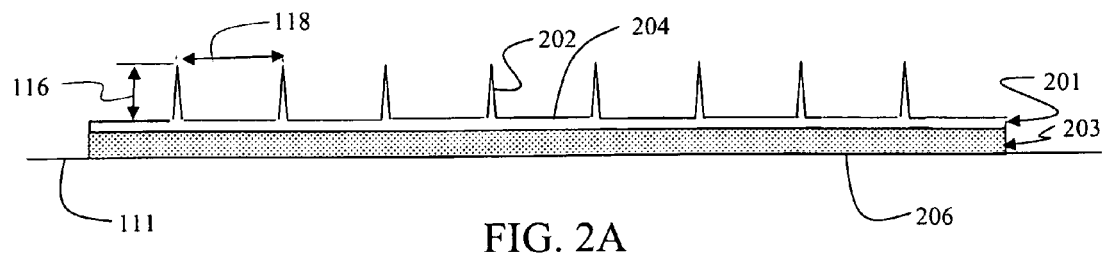
FIG. 2A is a lateral section view perpendicular to the flow direction of a first embodiment for high stiffness tipped riblets.
Figure 2B:
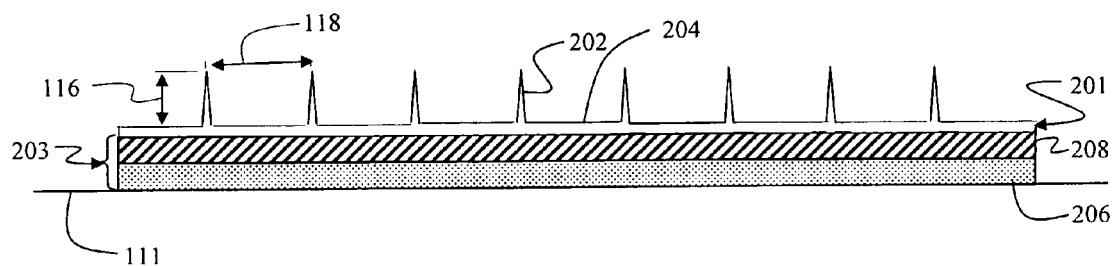
FIG. 2B is a lateral section view of a modification of the embodiment of FIG. 2A with an additional support layer.

A first embodiment for amorphous metal riblets 112 is shown in FIG. 2A. Individual tips 202 of the riblets protrude from a surface layer 204 to provide a first layer 201 of the multilayer construction. The protruding riblet tips 202 and continuous surface layer 204 are formed by casting or deposition of an amorphous metal layer or foil, as will be described in greater detail subsequently, of the amorphous metal material chosen providing a first characteristic of durability, environmental protection and/or highly reflective appearance to additionally provide a decorative feature. For the embodiment shown in FIG. 2A a second layer 203 created by an adhesive layer 206 is deposited on the surface layer 204. Exemplary adhesives for use in various embodiment may include, without limitation, acrylic pressure sensitive adhesive, sylilated polyurethane pressure sensitive adhesive; thermoplastic adhesive; heat-reactive adhesive or epoxy adhesive. In alternative embodiments, a supporting polymer layer 208 engages the surface layer 204 intermediate the surface layer and adhesive layer 206 as shown in FIG. 2B as a portion of the second layer. The supporting polymer layer 208 may be a polymer film or other suitable material. In certain embodiments polyetheretherketone (PEEK) is employed as the film. The polymer, adhesive and/or other elements in the second layer provide a second characteristic of resilience and the ability to adhere to the surface.

Figure 2C:
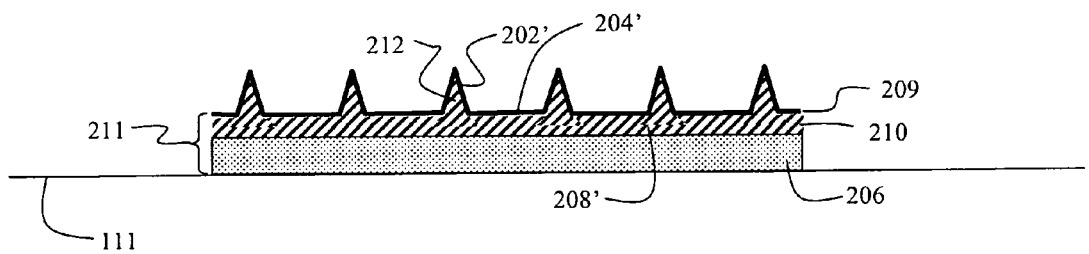
FIG. 2C is a lateral section view of a modification of the embodiment of FIG. 2A with high stiffness cladding over an elastomer core.

FIG. 2C is an additional alternative embodiment wherein the amorphous metal material is employed as a contoured surface cladding 209 forming the tips 202' and surface layer 204'. A polymer or elastomeric layer 210 is cast into the cladding 209 or conversely the cladding 209 is cast over the elastomeric layer 210 to provide both a support layer 208' and light weight cores 212 for the tips. Exemplary elastomers used in exemplary embodiments may be, without limitation, polyurethane elastomers, polysulfide elastomers, epoxy-based elastomers, silicones, fluoroelastomers, fluorosilicone elastomers, Ethylene-Propylene-Diene Monomer (EPDM) elastomers, or other polymers with lower strain to yield, for example thermoplastic polyurethanes, PEEK, Polyetherketoneketone (PEKK) or polyamide. This alternative embodiment may allow weight reduction and flexibility of the structure may be further enhanced. Additionally, a shape memory elastomeric material may be employed for enhancing damage resistance and shape recovery.

In the form shown in FIG. 2A, 2B or 2C, the embodiment may fabricated as an appliqué 211 which can then be adhered to the aerodynamic surface using the adhesive layer 206.

Figure 2D:
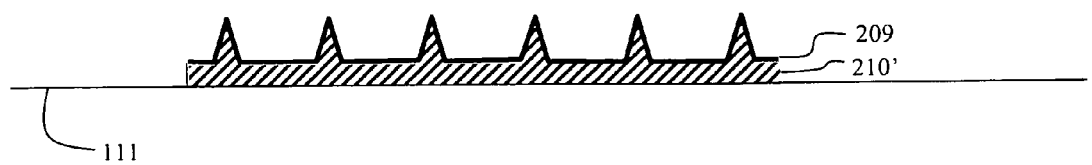
FIG. 2D is a lateral section view of a modification of the embodiment of FIG. 2A without an adhesive layer for direct thermoplastic boding.

In alternative embodiments, the surface layer 210' may be directly adhered to or deposited on the aerodynamic surface 111. FIG. 2D demonstrates an embodiment similar to that described with respect to FIG. 2C however, no adhesive layer is employed. Elastomeric layer 210' is a thermoplastic cast into the amorphous metal cladding which allows direct bonding to the aircraft surface with application of heat.

Figure 2E:
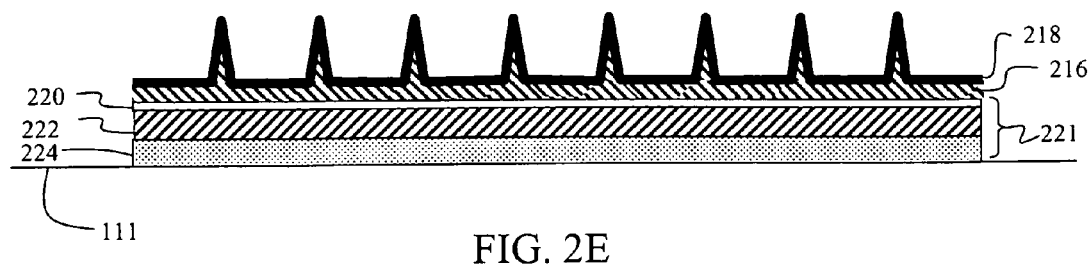

FIG. 2E demonstrates yet another embodiment wherein a multilayer structure incorporating a metallic layer 212 such as aluminum foil, a polymer layer 214 such as PEEK and an adhesive layer 216 are adhered to support layer 210. The foil, polymer and adhesive multilayer structure may be comparable to a current lightning strike appliqué (LSA) employed for composite aircraft structural surfaces. A metal mesh or screen may be employed instead of foil in alternative embodiments.

Figure 3:
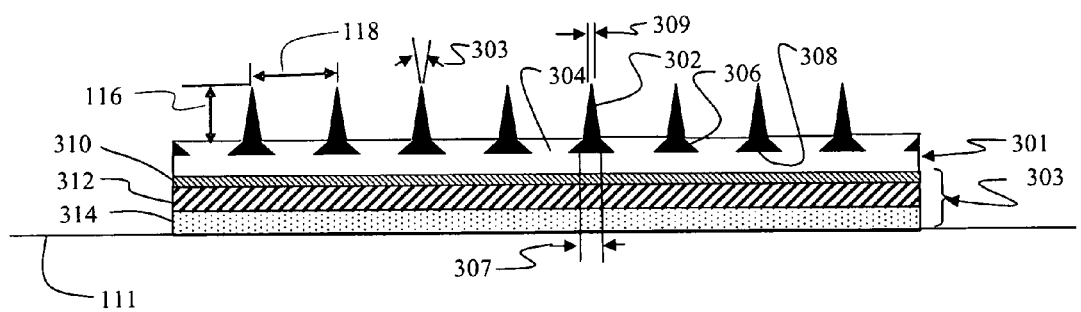
FIG. 3 is a lateral section view of a second embodiment for high stiffness tipped riblets with structural separation of the riblets perpendicular to the flow path.

Another embodiment for amorphous metal riblets 112 is shown in FIG. 3. With multiply curved surfaces, it may be desirable in the first layer 301 for the individual riblet tips 302 to be separated from each other substantially perpendicular to the flow direction 114 for greater lateral flexibility. For the embodiment shown, individual tips 302 protrude from an elastomeric layer 304. Tips 302 have an internal angle 303 of approximately 30° for the exemplary embodiment of FIG. 3. A base 306 expands from each tip 302. In certain embodiments the elastomeric layer 304 surrounds the base 306 to provide greater structural continuity. In alternative embodiments a bottom face 308 of the base 306 adheres directly to the exposed surface of the elastomeric layer 304.

The second layer 303 is created by a multilayer structure, which may be a preformed appliqué, incorporating a screen and/or foil metallic layer 310 such as aluminum, a polymer layer 312 such as PEEK and an adhesive layer 314 supports the elastomeric layer 304. As in the embodiment described with respect to FIG. 2E, the aluminum layer provides a conducting material for lightning strike protection in an exemplary aircraft usage of the embodiment.

The elastomer layer 304 supporting the amorphous metal riblet tips 302 provides additional elastic sideways deformation and recovery for the tips 302 when lateral forces are applied thereby further enhancing the durability of the high stiffness riblet tips. Additionally, the flexible elastomeric layer 304 allows greater ability to conform to complex shapes.

Figure 4:
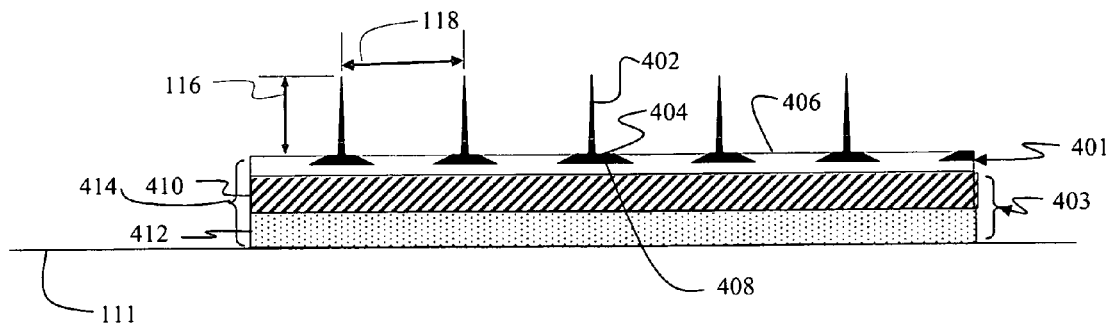
FIG. 4 is a lateral section view of a third embodiment for high stiffness tipped riblets with reduced cross-section and with separation perpendicular to the flow direction.

FIG. 4 demonstrates a third embodiment for the amorphous metal riblets 112 which takes advantage of the structural capability provided by the material from which the riblets are formed to allow a sharper profile of tips 402. For the embodiment shown in each of the tips 402 extends from a base 404 supported in an elastomer layer 406. As with the embodiment described with respect to FIG. 3 the base 404 of each tip 402 is surrounded by the elastomer to structurally retain the base within the elastomer layer 406. In alternative embodiments the extended bottom surface 408 of the base may be adhered to the surface of the elastomer layer 406. The embodiment of FIG. 4 also employs riblets separated perpendicular to the flow direction as in the embodiment of FIG. 3. However, alternative embodiments a continuous surface layer from which the tips extend as disclosed for the embodiment described with respect to FIG. 1 may be employed.

As also disclosed in FIG. 4 the embodiment employs a supporting polymer layer 410 on which the elastomer layer 406 is adhered or deposited. An adhesive layer 412 extends from the polymer layer 410 opposite the elastomer layer 406 forming a multilayer appliqué 414.

Figure 5A:
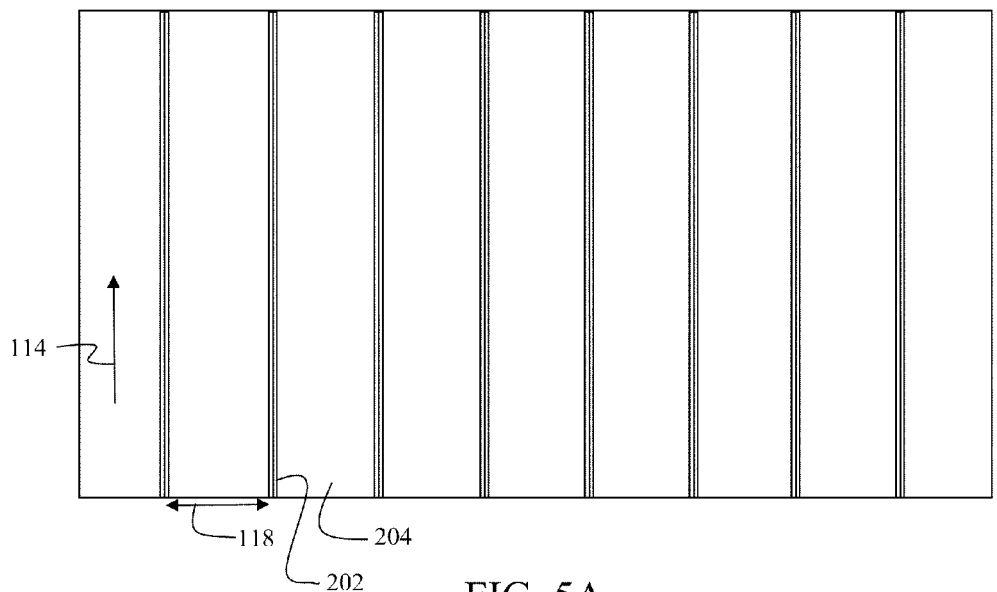
FIG. 5A is a top view of a portion of an aerodynamic surface employing riblets of the first embodiment as shown in FIG. 2B.
Figure 5B:
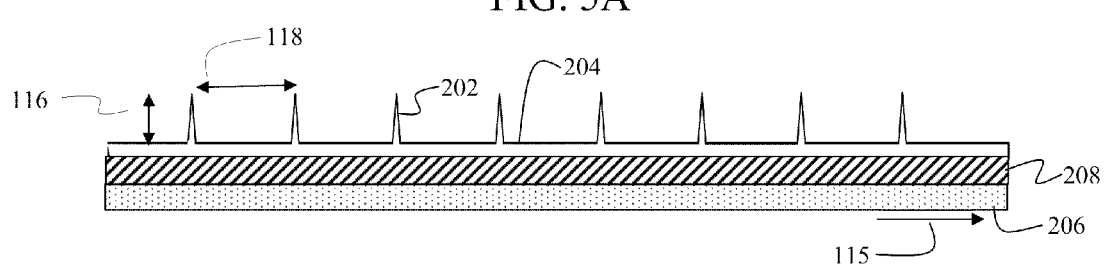
FIG. 5B is a section view comparable to FIG. 2B for reference with the features of FIG. 5A.

FIG. 5A shows a top view of the embodiment as disclosed in FIG. 2B. The riblets 112 formed by the tips 202 expand longitudinally along surface layer 204 in the flow direction 114. The thin surface layer 204 provides for flexibility in adhering to curvature having tangents as represented by arrow 115 perpendicular to the riblets. The amorphous metal materials employed in the riblet appliqué may have advantages in providing a highly shiny surface for decorative application and providing improved durability to underlying composite structures by means of absorbing impact energies. Additionally, the amorphous metal foil or cladding 209 may provide resistance to electromagnetic effects which composite structure alone may not provide thereby substituting for or supplementing LSA foil appliqués and similar materials.

Figure 6A:
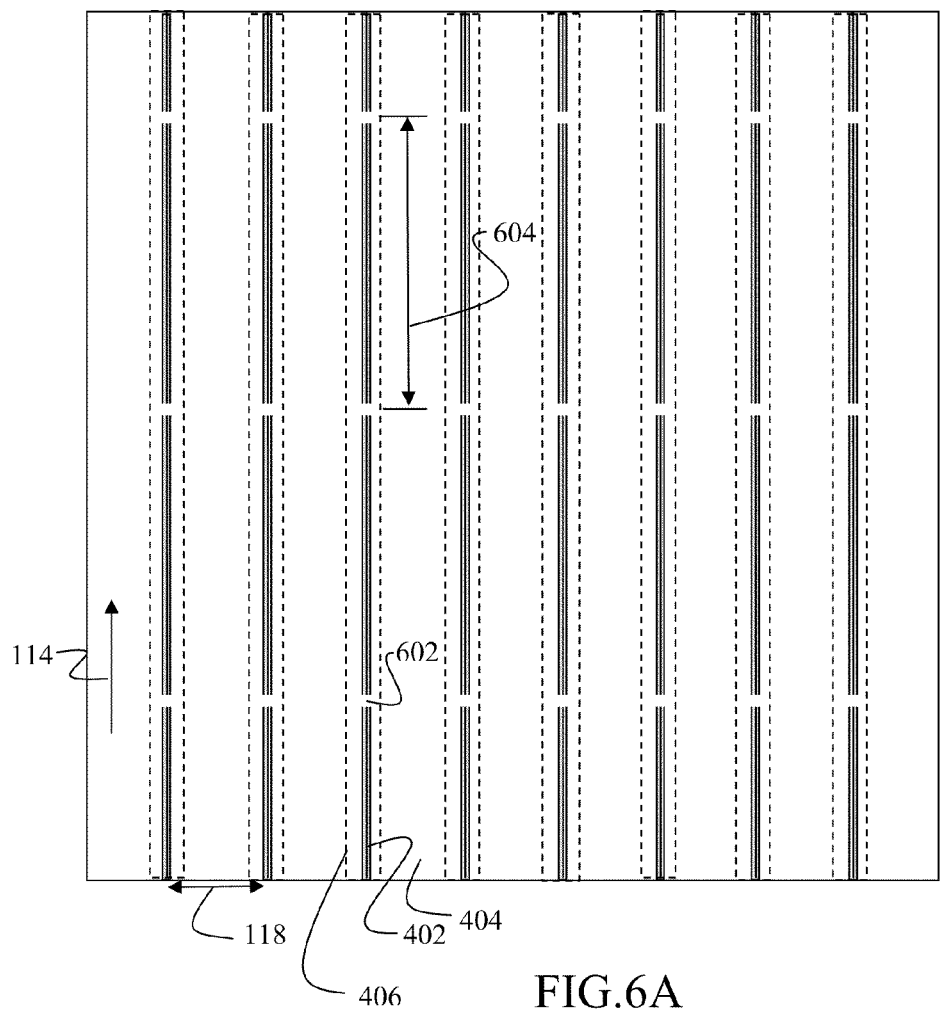
FIG. 6A is a top view of a portion of an aerodynamic surface employing riblets of the second embodiment shown in FIG. 3 with additional longitudinal separation of riblet sections.
Figure 6B:
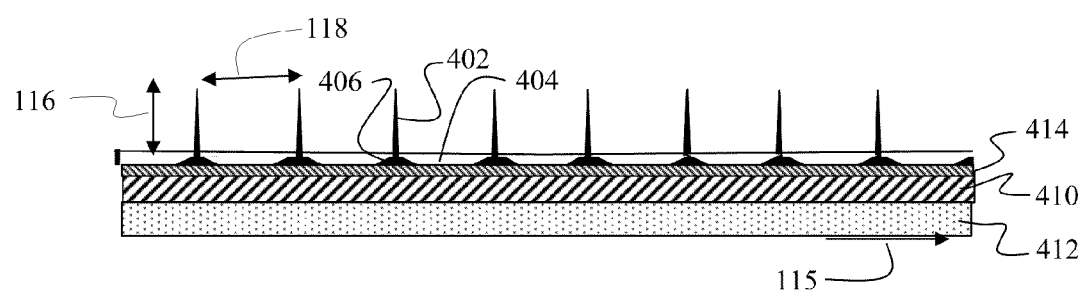
FIG. 6B is a section view comparable to FIG. 3 for reference with the features of FIG. 6A.

However as previously described, the surfaces on which the riblets 112 may be employed may have complex or multiple curvatures requiring greater flexibility. The embodiments previously described may therefore be adapted as shown in FIG. 6A wherein the individual tips 402 as described with respect to FIG. 4 and shown in modified form in FIG. 6B are separated perpendicular to the flow direction by spacing 118 with bases 406 attached to or captured within an elastomer layer 404. This provides even greater flexibility for adhering to surfaces with curvatures having tangents perpendicular to the riblets as represented by arrow 115. The scale of the drawings herein based on the small riblet dimensions makes the surfaces appear flat even though they may be curved in larger scale. Additionally the individual riblet tips 402 incorporate longitudinal separation using gaps 602 to segment the riblets 112 to provide greater flexibility for adhering to surfaces having curvatures with tangents parallel to the riblets 112. For the embodiment shown gaps 602 may be substantially evenly spaced in the riblets 112 at substantially equal longitudinal distances 604. In alternative embodiments spacing on individual riblets 112 and between riblets 112 may be uneven and chosen in a predetermined manner to accommodate the surface curvature as required. In the embodiment shown in FIG. 6B, a metal foil layer 414 is shown for lightning protection when non-metallic tips 402 are employed.

Figure 7:
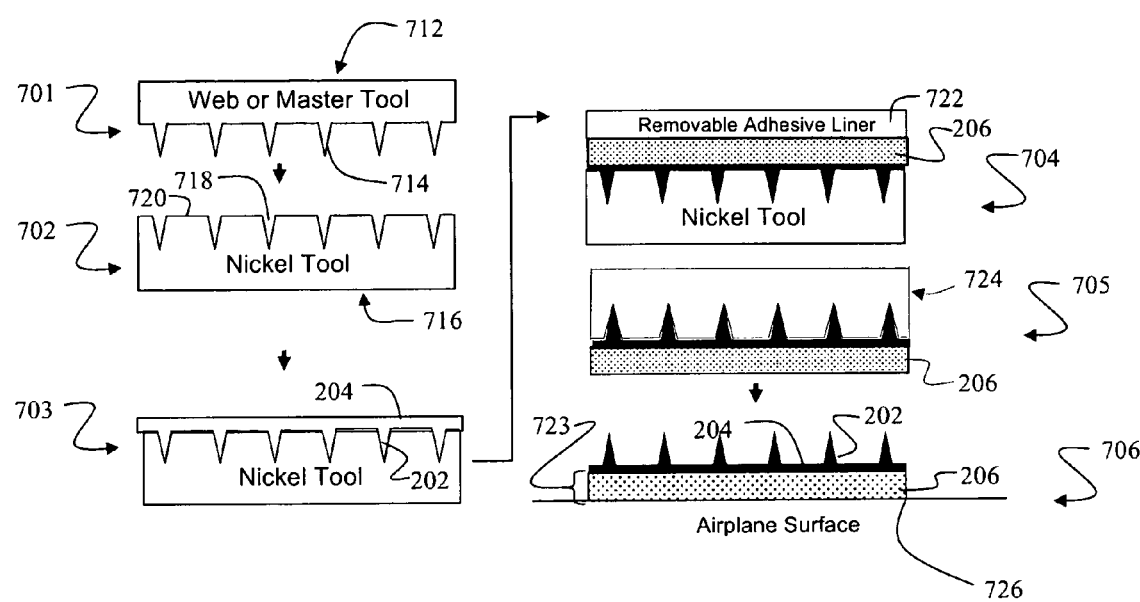
FIG. 7 is a flow diagram of processing steps for an exemplary method of fabrication of amorphous metal riblets of the first embodiment.
Figure 8:
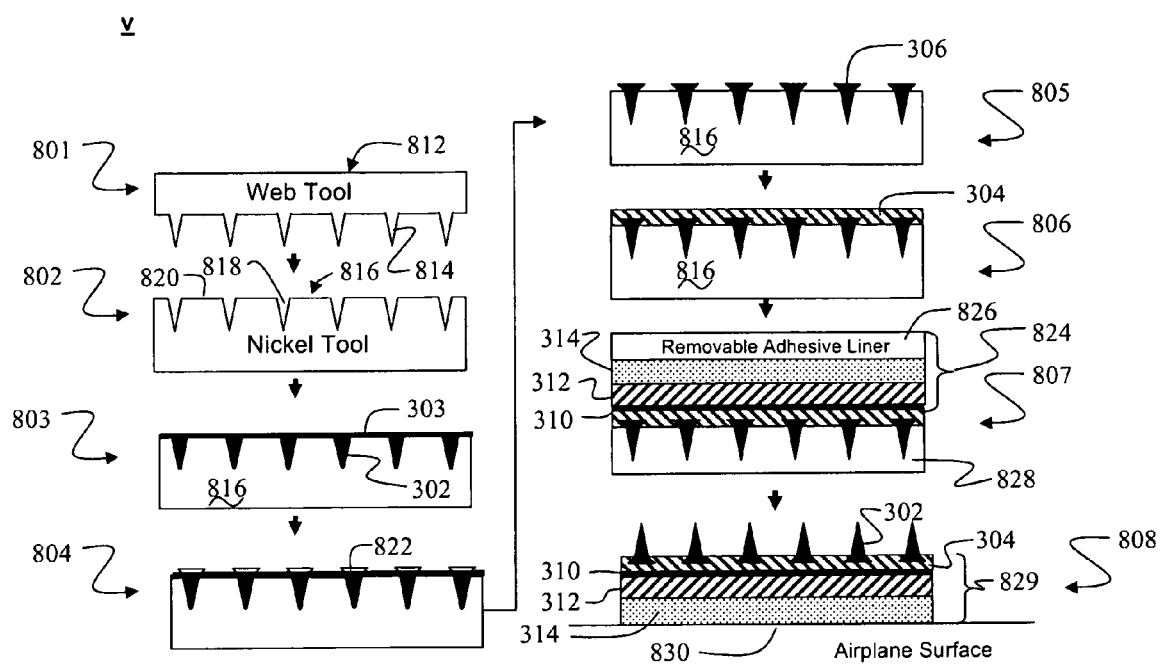
FIG. 8 is a flow diagram of processing steps for an exemplary method of fabrication of amorphous metal riblets of the second embodiment.

FIG. 7 is a flow diagram showing a first exemplary manufacturing process for a riblet structure as defined in the embodiment described with respect to FIG. 2A. In step 701 a master tool or replication of a master tool 712 is created using, as an example without limitation, diamond machining of a copper form as the master tool on which an acrylate film is cured as the replication and then stripped to define spaced protuberances 714 corresponding to the desired riblet dimensions. The tool 712 as shown in FIG. 7 may be a section of a flat tool or a roller employed for roll-to-roll web processing. In alternative embodiments, a roller may be employed, for example a nickel tool partially submerged in the plating bath and as the foil is deposited onto the "master" roll it is released/pulled off of the roller which causes the roll to rotate exposing a clean portion of the roller to the electroforming bath. A complimentary tool 716 is created in step 702 by impression, melt casting or electroforming on the master tool 712, which provides grooves 718 corresponding to the riblet shape. Spacing between the grooves provides a substantially flat intermediate surface 720 corresponding to the dimension 118 desired between the riblets 112. In a web processing format, the complimentary tool 716 may be silicon and be retained on the cast tips as a protective masking. In step 703 amorphous metal tips 202 and surface layer 204 are cast, rolled or deposited onto the complimentary tool 716 followed by thermal processing to optimize the glass structure. In certain embodiments, a release compound is applied to the complimentary tool to assist in removal of the cast riblet tips 202 and surface layer 204 from the tool. Adhesive layer 206 is then applied in step 704 to the surface layer 204 opposite the amorphous metal tips 202. The adhesive layer 206 may be combined with a polymer layer and supplied as a preformed appliqué 824 as shown in FIG. 8 which is then joined with the cast surface layer 202. A removable adhesive liner 722 for handling of the completed multilayer appliqué 723 is added as also shown in step 704. The multilayer appliqué 723 is then removed from the complimentary tool 716, and masking 724 may be applied to the riblet array to protect the tips 202 during handling as shown in step 705 Application to the aircraft surface 726 is accomplished by removal of the adhesive liner 722 followed by attachment of the adhesive layer of the appliqué to aircraft surface 726 as shown in step 706.

FIG. 8 is a flow diagram showing a manufacturing process for a riblet structure as defined in the embodiment described with respect to FIG. 3. In step 801 a web tool 812 is created as previously described with respect to FIG. 7 to define spaced protuberances 814 corresponding to the desired riblet dimensions. The tool as shown in FIG. 8 may be a section of a flat tool or a roll tool employed for web processing. A complimentary tool 816 is created in step 802 by impression on the web tool 812 which provides grooves 818 corresponding to a riblet shape. Spacing between the grooves provides a substantially flat intermediate surface 820 corresponding to the dimension 118 desired between the riblets tips 302. Amorphous metal tips 302 are cast or deposited onto the tool 816 in step 803 including an intermediate web 303 between the tips 302. In step 804 resist 822 is applied to the bases 306 of the riblet tips 302 in the complimentary tool 816. The cast amorphous metal including the web is etched to remove the web and shape the bases 306 of the tips 302 and the resist is then removed in step 805 providing the spaced riblets in the tool 816. For the embodiment shown the bases 306 are placed into relief extending from the tool by the etching around the resist. The elastomer layer 304 is then cast over the riblet bases 306 in step 806. In alternative embodiments casting of the amorphous metal tips 302 provides a base flush with the flat surface 820 for direct adherence to the elastomer surface as previously described with respect to FIG. 3. For the exemplary process shown with respect to FIG. 8 a preformed appliqué 824 comprising the multilayer structure of a metallic layer 310 such as aluminum foil, a polymer layer 312 and adhesive layer 314 is adhered to the cast elastomer in step 807. A removable adhesive liner 826 for preservation of the adhesive during further processing is shown. The multilayer structure is then removed from the complimentary tool 816 creating a multilayer riblet array appliqué 829 exposing the amorphous metal tips 302. Masking 828 is applied over the tips 302 and elastomer layer 304 to assist in handling during additional processing. The masking in exemplary embodiments may be, without limitation, a solution cast releasable polymer such as silicon or an adhesive film such as Mylar® with a low tack acrylic adhesive applied during roll processing. Alternatively, a water/fluid soluble polymer may be employed to allow removal of the masking by dissolving with water or other fluid after installation.

The completed multilayer riblet array appliqué 829 may then be applied to an airplane surface 830 by removing the adhesive liner and adhering the adhesive layer 314 to the surface 830 as shown in step 808. The masking 828 is then removed from the tips 302 and elastomer layer 304 providing the completed the riblet surface.

The amorphous metal materials employed for the tips as described in the embodiments and fabrication processes herein allows very fine tip structure having dimensions 307 of around 15 to 25 microns at the base with a dimension 309 the extreme end of the tips typically on the order of 100 nanometers (0.1 micron). Finer tip geometries may be obtained with tooling and release process refinement. Even thought the tips are very sharp, the very fine spacing of the tips avoids cuts in normal handling by installation personnel.

Figure 9A:
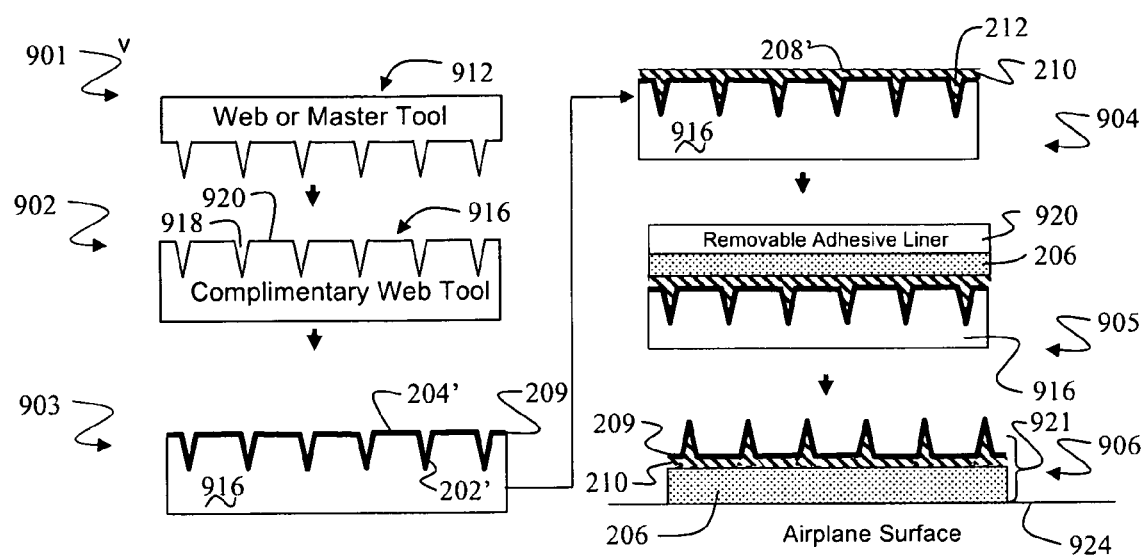
FIG. 9 is a flow diagram of processing steps for an exemplary method of fabrication of amorphous metal riblets of a third embodiment.

FIG. 9A is a flow diagram showing a manufacturing process for a riblet structure as defined in the embodiment described with respect to FIG. 2A. In step 901 a master tool 912 is created using, as previously described with respect to FIG. 7. The tool as shown in FIG. 9A may be a section of a flat tool or a roller employed for roll-to-roll web processing. For the embodiment shown in FIG. 9A amorphous metal is employed for the tips 202' and surface layer 204'. A complimentary tool 916 is created in step 902 by impression on the master tool 912 which provides grooves 918 corresponding to the riblet shape. Spacing between the grooves provides a substantially flat intermediate surface 920 corresponding to the dimension 118 desired between the riblets tips 202'. In web processing applications, complimentary tool 916 may be formed from silicon or a water/fluid soluble polymer may be employed. The complimentary tool 916 then forms a masking layer for protection of the cast riblets tips prior to application of the riblet array to the aircraft surface. In step 903 amorphous metal film or cladding 209 is cast, deposited or roll formed into the complimentary tool to form amorphous metal tips 202' and surface layer 204' in step 911. In certain embodiments, a release compound is applied to the complimentary tool to assist in removal of the cast riblets 202' and surface layer 204' from the complimentary tool 916. Elastomeric layer 210 is then cast into the cladding 209 to provide both a support layer 208' and light weight cores 212 for the tips 202' in step 904. Adhesive layer 206 is then applied in step 904 to the support layer 208' opposite the tips 202' in step 905 to create a multilayer appliqué 921. A removable adhesive liner 920 for handling of the completed appliqué is added as also shown in step 905. Application to the aircraft surface is accomplished as shown in step 906 by removal of the adhesive liner 920 followed by attachment of the adhesive layer 206 of the multilayer appliqué 921 to aircraft surface 922 at which time the complimentary web tool 916 is stripped from the array of riblet tips 202' and surface layer 204'. For the alternative water/fluid soluble polymer tool, the tool is removed by dissolving with water or other fluid after installation.

Figure 9B:
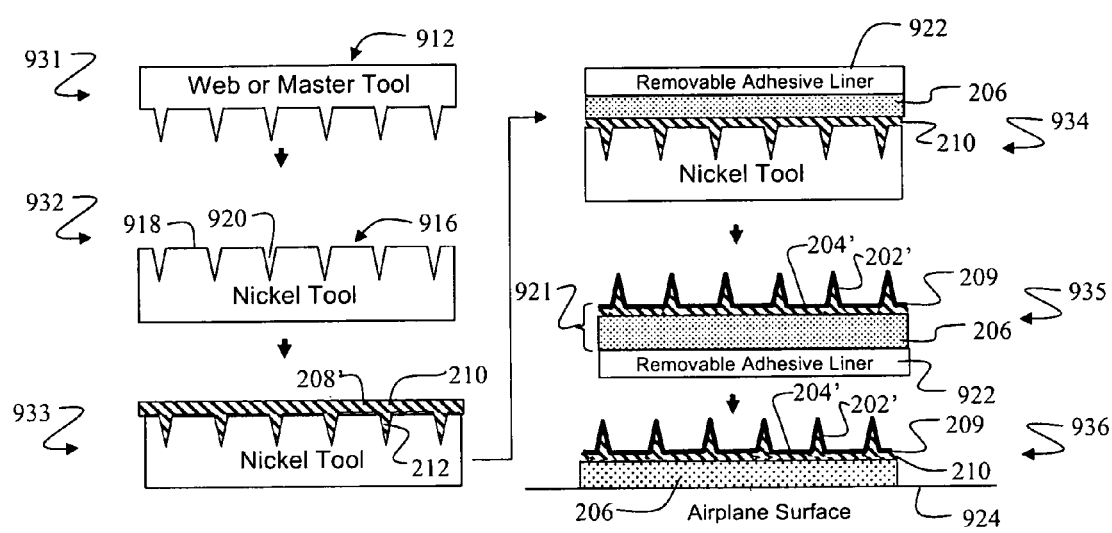

In an alternative method for hard tooling to avoid release issues between the amorphous metal cladding and the tooling, a process shown in FIG. 9B is employed to form the polymer or elastomeric support layer using the tooling and then deposit the cladding over the support layer. In step 931 a master tool 912 is created using, as previously described with respect to FIG. 9A. The tool 912 as shown in FIG. 9B may be a section of a flat tool or a roller employed for roll-to-roll web processing. A complimentary tool 916 is created in step 932 by impression on the master tool 912 which provides grooves 918 corresponding to the riblet shape. Spacing between the grooves provides a substantially flat intermediate surface 920 corresponding to the dimension 118 desired between the riblets tips 202'. A core layer 210 is then cast into the complimentary tool 916 to provide both a support layer 208' and light weight cores 212 in step 933. In certain embodiments, a release compound is applied to the complimentary tool to assist in removal of the core layer 210 from the tool 916. Adhesive layer 206 is then applied in step 934 to the support layer 208' opposite the elastomeric tips cores 212. A removable adhesive liner 916 for handling of the completed appliqué is added as also shown in step 934. In step 935, which may be conducted prior to the addition of the adhesive and liner, the core layer 210 is removed from the complimentary tool 916 and an amorphous metal film or cladding 209 such as Vitreloey 105 (Zr: 52.5 Ti: 5 Cu: 17.9 Ni: 14.6 Al: 10) or Vitreloy 106a (Zr: 58.5 Cu: 15.6 Ni: 12.8 Al: 10.3 Nb: 2.8) is deposited by sputtering or alternative deposition technique onto the core layer 210 to form an array of high stiffness riblet tips 202' and surface layer 204' creating a multilayer appliqué 921. In various embodiments, the core layer 210 may be a polymer, for example without limitation, thermoplastic polyurethanes, PEEK, PEKK or polyamide, an elastomeric, which may or may not have shape memory properties, for example without limitation polyurethane elastomers, polysulfide elastomers, epoxy-based elastomers, silicones, fluoroelastomers, fluorosilicone elastomers, Ethylene-Propylene-Diene Monomer (EPDM) elastomers, and polyhedral oligosilsesquioxane (POSS)-modified polyurethane, or a shape memory alloy (SMA), for example without limitation, copper-zinc-aluminum-nickel, copper-aluminum-nickel, nickel-titanium (NiTi), pseudo-elastic beta titanium alloys. Application to the aircraft surface 922 is accomplished as shown in step 936 by removal of the adhesive liner 922 followed by attachment of the adhesive layer 206 of the multilayer appliqué 921 to aircraft surface 922.

Figure 10:
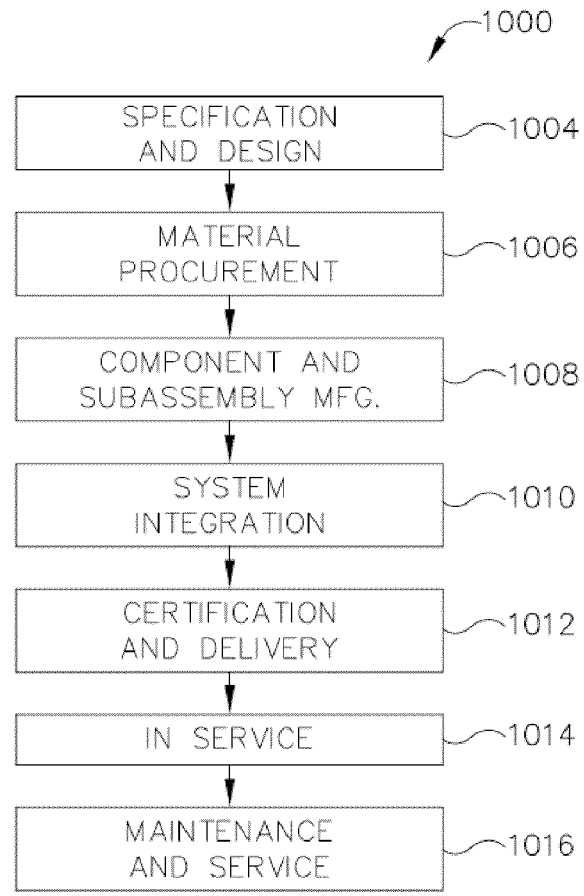
FIG. 10 is a flow diagram describing use of the amorphous metal riblets embodiments disclosed herein in the context of an aircraft manufacturing and service method.
Figure 11:
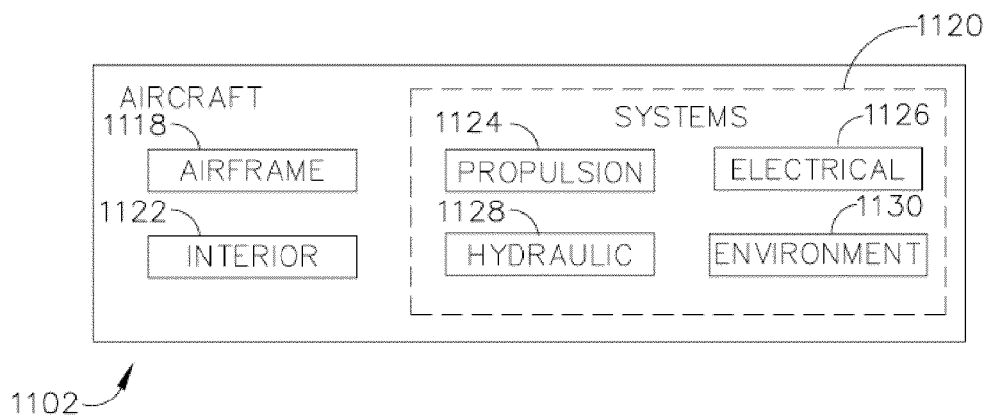
FIG. 11 is a block diagram representing an aircraft employing the amorphous metal riblets with embodiments as disclosed herein.

Referring more particularly to FIGS. 10 and 11, embodiments of the high stiffness riblets disclosed herein and the methods for their fabrication may be described in the context of an aircraft manufacturing and service method 1000 as shown in FIG. 10 and an aircraft 1102 as shown in FIG. 11. During pre-production, exemplary method 1000 may include specification and design 1004 of the aircraft, which may include the riblets, and material procurement 1006. During production, component and subassembly manufacturing 1008 and system integration 1010 of the aircraft takes place. The riblet appliqués and their manufacturing processes as described herein may be accomplished as a portion of the production, component and subassembly manufacturing step 1008 and/or as a portion of the system integration 1010. Thereafter, the aircraft may go through certification and delivery 1012 in order to be placed in service 1014. While in service by a customer, the aircraft 1002 is scheduled for routine maintenance and service 1016 (which may also include modification, reconfiguration, refurbishment, and so on). The riblet appliqués as described herein may also be fabricated and applied as a portion of routine maintenance and service.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 1102 produced by exemplary method 1000 may include an airframe 1118 having a surface 111, as described with respect to FIG. 1, and a plurality of systems 1120 and an interior 1122. Examples of high-level systems 1120 include one or more of a propulsion systems 1124, an electrical and avionics system 1126, a hydraulic system 1128, and an environmental system 1130. Any number of other systems may be included. The high stiffness tipped riblets supported by the embodiments disclosed herein may be a portion of the airframe, notably the finishing of skin and exterior surfaces. Although an aerospace example is shown, the principles of the disclosure herein may be applied to other industries, such as the automotive industry and the marine/ship industry.

Apparatus and methods embodied herein may be employed during any one or more of the stages of the production and service method 1000. For example, components or subassemblies corresponding to production process 1008 may be fabricated or manufactured in a manner similar to components or subassemblies produced while the aircraft 1102 is in service. Also, one or more apparatus embodiments, method embodiments, or a combination thereof may be utilized during the production stages 1008 and 1010, for example, by substantially expediting assembly of or reducing the cost of an aircraft 1102. Similarly, one or more of apparatus embodiments, method embodiments, or a combination thereof may be utilized while the aircraft 1102 is in service, for example and without limitation, to maintenance and service 1016.

Having now described various embodiments in detail as required by the patent statutes, those skilled in the art will recognize modifications and substitutions to the specific embodiments disclosed herein. Such modifications are within the scope and intent of the present disclosure as defined in the following claims.

What is claimed is:

1. An array of riblets comprising:
   a plurality of amorphous metal tips;
   a polymer layer supporting said amorphous metal tips in predetermined spaced relation, said layer adhering to a vehicle surface;
   an adhesive layer deposited on the elastomeric layer to form a multilayer appliqué, said adhesive layer adhering the multilayer appliqué to the vehicle surface; and,
   a metallic layer and a polymer layer intermediate the elastomeric layer and the adhesive layer.

2. The array of riblets as defined in claim 1 wherein the metallic layer, polymer layer and adhesive layer are a preformed appliqué.

3. The array of riblets as defined in claim 1 wherein each tip is segmented in the flow direction.

4. The array of riblets as defined in claim 1 wherein each tip is highly reflective providing a decorative feature on the vehicle surface.

* * * * *